United States Patent
Tobata

(10) Patent No.: US 7,028,802 B2
(45) Date of Patent: Apr. 18, 2006

(54) SEATBELT APPARATUS FOR VEHICLE

(75) Inventor: Hideo Tobata, Yokosuka (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 383 days.

(21) Appl. No.: 10/669,005

(22) Filed: Sep. 24, 2003

(65) Prior Publication Data

US 2004/0060762 A1 Apr. 1, 2004

(30) Foreign Application Priority Data

Sep. 30, 2002 (JP) .......................... P 2002-286402

(51) Int. Cl.
*B60R 21/00* (2006.01)

(52) U.S. Cl. ..................... 180/268; 180/282; 280/806; 701/45

(58) Field of Classification Search ................ 280/735, 280/806, 807; 180/282; 297/475, 480; 701/45
See application file for complete search history.

(56) References Cited

U.S. PATENT DOCUMENTS

| | | | |
|---|---|---|---|
| 5,552,986 A * | 9/1996 | Omura et al. .................. 701/45 |
| 5,605,202 A * | 2/1997 | Dixon ......................... 180/268 |
| 6,370,461 B1 | 4/2002 | Pierce et al. |
| 6,616,186 B1 * | 9/2003 | Midorikawa et al. ..... 280/801.1 |
| 6,626,463 B1 * | 9/2003 | Arima et al. ................ 280/806 |
| 6,846,019 B1 * | 1/2005 | Tobata ......................... 280/806 |
| 6,959,613 B1 * | 11/2005 | Tobata .................... 73/862.391 |

FOREIGN PATENT DOCUMENTS

| | | |
|---|---|---|
| DE | 44 11 184 A1 | 10/1994 |
| DE | 196 36 448 | 4/1997 |
| DE | 199 27 731 A1 | 12/2000 |
| DE | 100 44 426 A1 | 4/2001 |
| DE | 697 09 217 T2 | 7/2002 |
| DE | 102 96 133 T5 | 4/2004 |
| EP | 08 00 970 | 10/1997 |
| JP | 2000-95064 A | 4/2000 |
| JP | 2000-114068 | 4/2001 |
| JP | P2002-2450 A | 1/2002 |

\* cited by examiner

*Primary Examiner*—Paul N. Dickson
*Assistant Examiner*—Toan C. To
(74) *Attorney, Agent, or Firm*—McDermott Will & Emery LLP

(57) ABSTRACT

A seatbelt apparatus includes a deceleration detecting sensor for detecting a decelerating state of a vehicle and a controller for controlling the drive of a motor for the seatbelt apparatus corresponding to a detected value of the deceleration detecting sensor. The controller is provided with a correcting unit for correcting the detected value of the deceleration detecting sensor in anticipation of the future so as to advance the operational timing of the motor. By advancing the judgment timing for urgency so that the operational timing of the motor is hastened, it is possible to restrain a passenger's body in an emergency certainly without enhancing a restraining force of a webbing unnecessarily.

13 Claims, 16 Drawing Sheets

FIG.12
(a) EXPECTED DECELERATION-VALUE
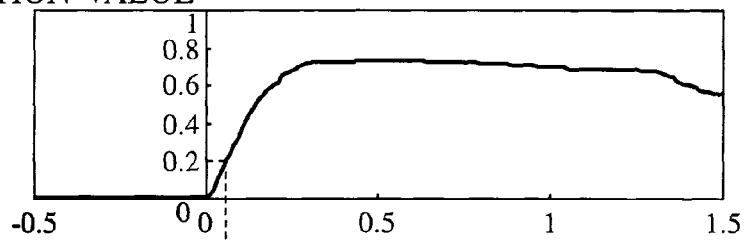
(b) EXPECTED RISING DECELERATION-VALUE
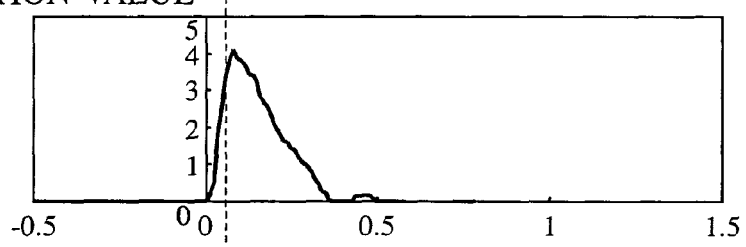
(c) PREDICTED DECELERATION-VALUE
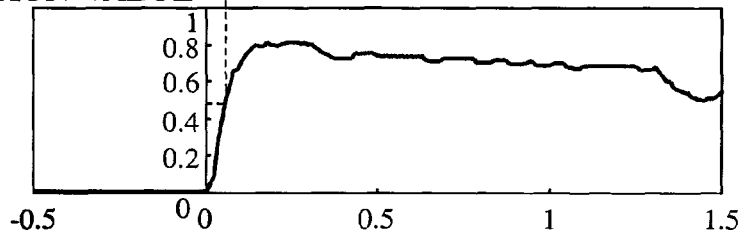
(d) ACTUAL DECELERATION-VALUE
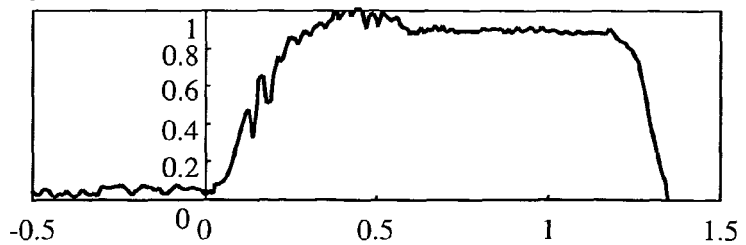

BRAKE PEDAL STROKE

VEHICLE SPEED

SEATBELT APPARATUS FOR VEHICLE

BACKGROUND OF THE INVENTION

1. Field of the Invention

The present invention relates to a seatbelt apparatus for a vehicle.

2. Description of Related Art

Japanese Patent Application Laid-open No. 2002-2450 discloses a seatbelt apparatus in which a motor rewinds a webbing at the stage of expecting a vehicle collision etc. thereby restricting a passenger while weakening a restraining force by the webbing in the normal state.

SUMMARY OF THE INVENTION

In the above-mentioned conventional seatbelt apparatus for a vehicle, the expectation of a vehicle collision is performed by detecting a great deceleration of a vehicle body by an accelerator meter. However, since the forward movement of a passenger's body has already started at the point of detecting such a great deceleration of the vehicle body, there is produced a delay to start winding the webbing.

Therefore, it is an object of the present invention to provide a seatbelt apparatus for a vehicle, which does not increase a restraining force in the normal state but can restrict a passenger in an emergency by correcting a detected value at a vehicle's decelerating thereby advancing the timing of starting winding a webbing.

According to the present invention, the above-mentioned object is accomplished by a seatbelt apparatus for a vehicle, comprising: a webbing for restraining a passenger seated on a seat; a retractor for winding and rewinding the webbing, a first pretensioner that allows the retractor to wind the webbing thereinto or rewind the webbing therefrom, a second pretensioner that applies a tension to the webbing in an emergency for the vehicle, thereby restraining the passenger through the webbing, a deceleration detecting sensor for detecting a decelerating state of the vehicle; and a controller for controlling the operations of the first pretensioner and the second pretensioner corresponding to a detected value from the deceleration detecting sensor, wherein the controller includes a correcting unit for correcting the detected value of the deceleration detecting sensor in anticipation of the future so as to advance a timing of the first pretensioner to wind the webbing.

According to the present invention, there is also provided a method of controlling a seatbelt for a vehicle, comprising: detecting a decelerating state of the vehicle by a deceleration detecting sensor, correcting a detected value from the deceleration detecting sensor so as to be larger than an actual deceleration of the vehicle or a value in correlation with the actual deceleration, and advancing a timing for a pretensioner to wind a webbing of the seatbelt, based on a correction value obtained by correcting the detected value.

BRIEF DESCRIPTION OF THE DRAWINGS

FIG. 12 is a diagram composed of timing charts showing the interrelationship among the expected deceleration-value, the expected rising deceleration-value, a predicted deceleration-value and an actual deceleration-value respectively;

DETAILED DESCRIPTION OF THE PREFERRED EMBODIMENT

Referring to accompanying drawings, embodiments of the present invention will be described below.

Referring to FIGS. 1 to 12, a seatbelt apparatus for a vehicle of the first embodiment of the present invention will be described at first.

Figure 1:
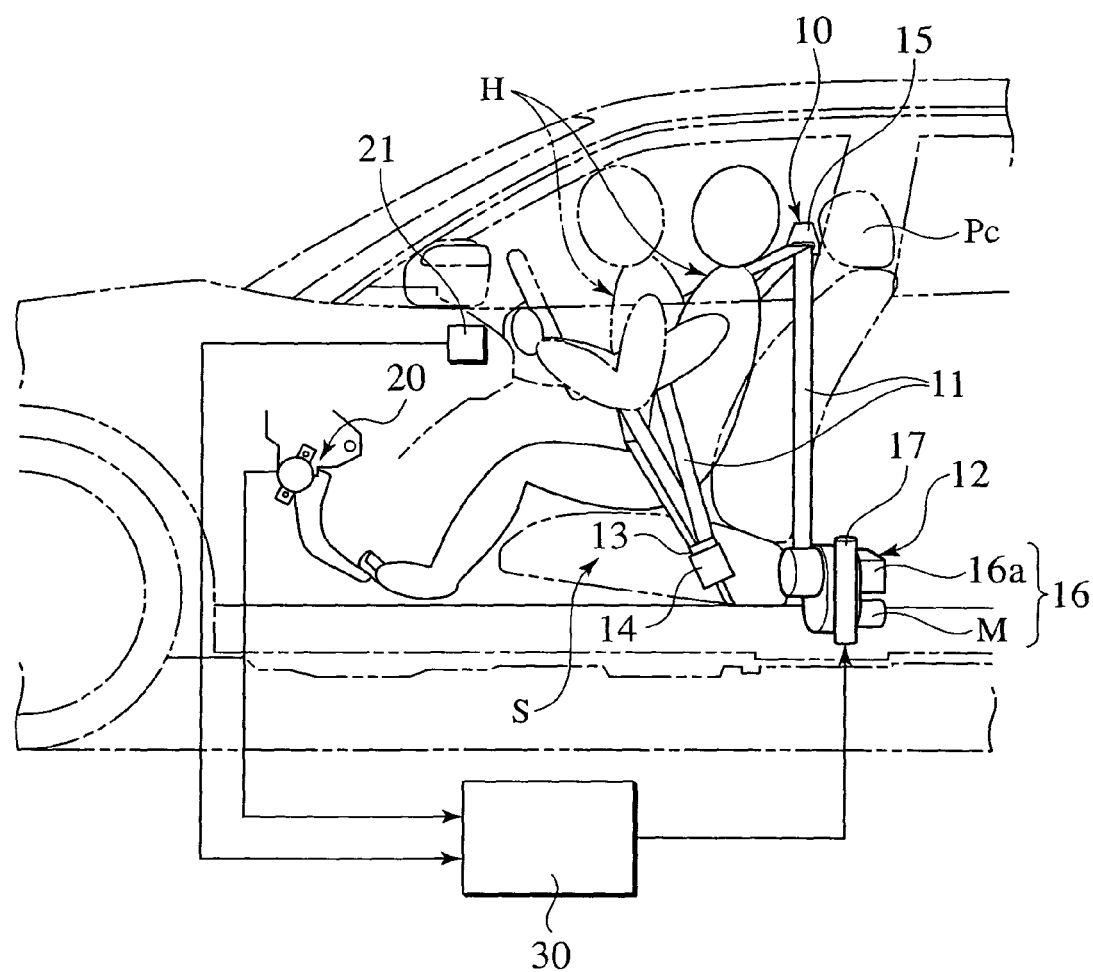
FIG. 1 is a schematic structural view of a seatbelt apparatus on a vehicle, in accordance with the first embodiment of the invention.

A seatbelt apparatus 10 for a vehicle of the first embodiment, which will be referred as "seatbelt apparatus" simply, is shown in FIG. 1 by example of a three-point suspension passive seatbelt. The apparatus 10 is equipped with a webbing 11 for restraining a passenger H seated on a seat S and a retractor 12 for winding one side of the webbing 11. The other end of the webbing 11 is fixed to a vehicle body through an anchor (not shown) on one side of the seat S close to an automotive door. A tongue 13 is movably fitted to an intermediate portion of the webbing 11 and detachably engaged with a buckle 14 fixed to the vehicle body, on the other side of the seat S close to a body's center in the direction of width of the vehicle body. Between the buckle 14 and the above retractor 12, the webbing 11 is movably supported by a through ring 15 on the upper part of a center pillar Pc.

The retractor 12 is provided with a first pretensioner 16 for winding the webbing 11 into the retractor 12 or rewinding the webbing 11 from the retractor 12 and a second pretensioner 17 that applies a tension to the webbing 11 thereby to restrain the passenger H finally if an emergency arises.

The first pretensioner 16 comprises a motor M and a reduction gear unit 16a and is adapted so as to transmit a torque as a result of reducing the revolutions of the motor M to a reel (not shown) disposed in the retractor 12 to wind the webbing 11.

The second pretensioner 17 is in the form of an explosion-type pretensioner in this embodiment and is adapted so as to instantly wind the webbing 11 into the retractor 12 due to explosion of filling powder when detecting a collision.

Noted that the second pretensioner 17 is not limited to the explosion-type pretensioner only and may adopt a motor or the like so long as it can wind the webbing 11 rapidly.

The retractor 12 is provided with a tension limiting mechanism that prevents a tension of the webbing 11 wound at a collision from exceeding a predetermined value thereby applying a large burden on the passenger H and a locking mechanism that detects an abrupt drawing out of the webbing 11 thereby locking up the withdrawal of the webbing 11.

According to the first embodiment, as shown in FIG. 1, the seatbelt apparatus 10 constructed above further includes a brake-pedal stroke sensor 20 as a deceleration detecting sensor for detecting a decelerating state of a vehicle and a controller 30 that inputs a brake-stroke signal from the sensor 20 and also various signals from a vehicle speed sensor 21, a not-shown acceleration detecting sensor and the others thereby to control the first and second pretensioners 16, 17.

Figure 2:
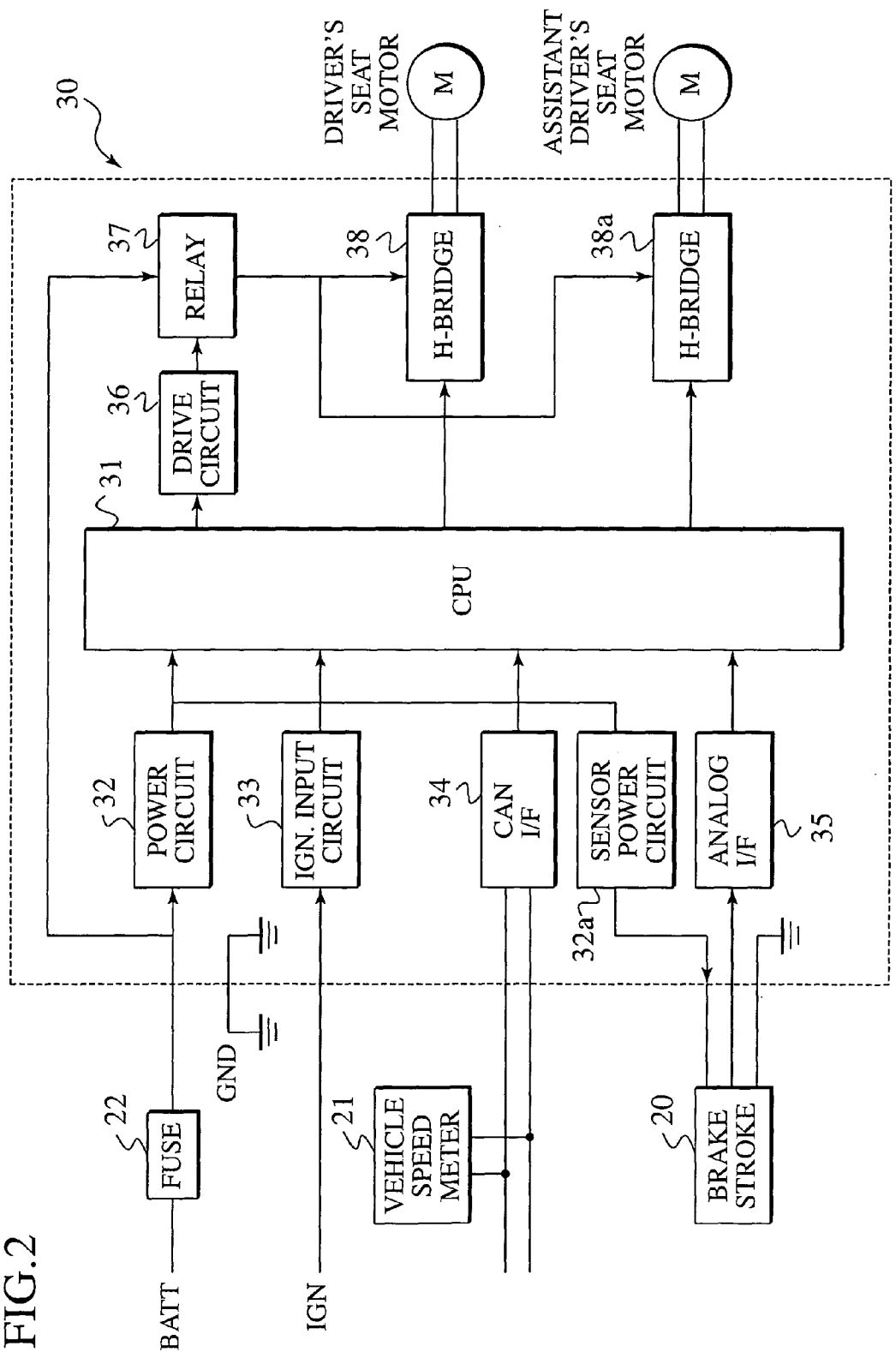
FIG. 2 is a structural view of a controller in accordance with the first embodiment of the invention.

FIG. 2 shows the constitution of the controller 30. As it will be understood obviously from the figure, the controller 30 is associated with two motors M for the first pretensioners 16: one motor for the seatbelt apparatus 10 for the driver's seat; and the other motor for the seatbelt apparatus 10 for the assistant driver's seat.

As shown in FIG. 2, the controller 30 comprises a CPU (central processing unit) 31, a power circuit 32 for supplying the CPU 31 with an electrical power through a fuse 22, an IGN (ignition) input circuit 33 for inputting an ignition signal, a CAN (controller Area Network)·I/F (interface) 34 for inputting a vehicle-speed signal from the vehicle speed sensor 21 and an Analog ·I/F 35 for inputting a brake-stroke signal from the brake-stroke sensor 20.

Noted that the electrical power via the power circuit 32 is introduced to not only the CPU 31 but also the brake-pedal stroke sensor 20 through a sensor power circuit 32a.

From the CPU 31, a control current is generated to a relay 37 through a drive circuit 36 and further generated to H-Bridges 38, 38a as rotating-direction switching circuits provided in the respective motors M for the driver's seat and the assistant driver's seat.

The electric power introduced from the fuse 22 to the power circuit 32 is inputted to the H-Bridges 38, 38a through the relay 37. The rotating directions of the respective motors M for the driver's seat and the assistant driver's seat are controlled by the H-Bridges 38, 38a. Further, the rotating speeds of these motors M are controlled in accordance with respective duty ratios calculated by the CPU 31.

The brake-pedal stroke sensor 20 is adapted to detect a stepping amount of a brake pedal to be manipulated by a driver at braking, by a rotating angle of a potentiometer. Due to the electric power supplied from a sensor power circuit 32a, the brake-pedal stroke sensor 20 generates a voltage corresponding to the above stepping amount against the brake pedal, to the CPU 31 through the Analog·I/F 35.

The data about vehicle speed detected by the vehicle speed sensor 21 is inputted to the CPU 31 through the CAN·I/F (interface) 34. Otherwise, without passing through the CAN·I/F 34, the vehicle speed sensor 21 may be constructed so as to output periodic pulses with a cycle corresponding to the vehicle speed. Then, the vehicle speed can be calculated by the periodic pulses.

By the brake stroke, the CPU 31 judges whether the vehicle is braking in an emergency or not. When the vehicle is braking in an emergency, the CPU 31 judges that the brake is being manipulated in order to avoid a vehicle collision and outputs command currents to the H-Bridges 38, 38a, in the form of duty ratios. In this way, the revolutions of the motors M are controlled to advance the winding operation of the webbing 11.

Figure 3:
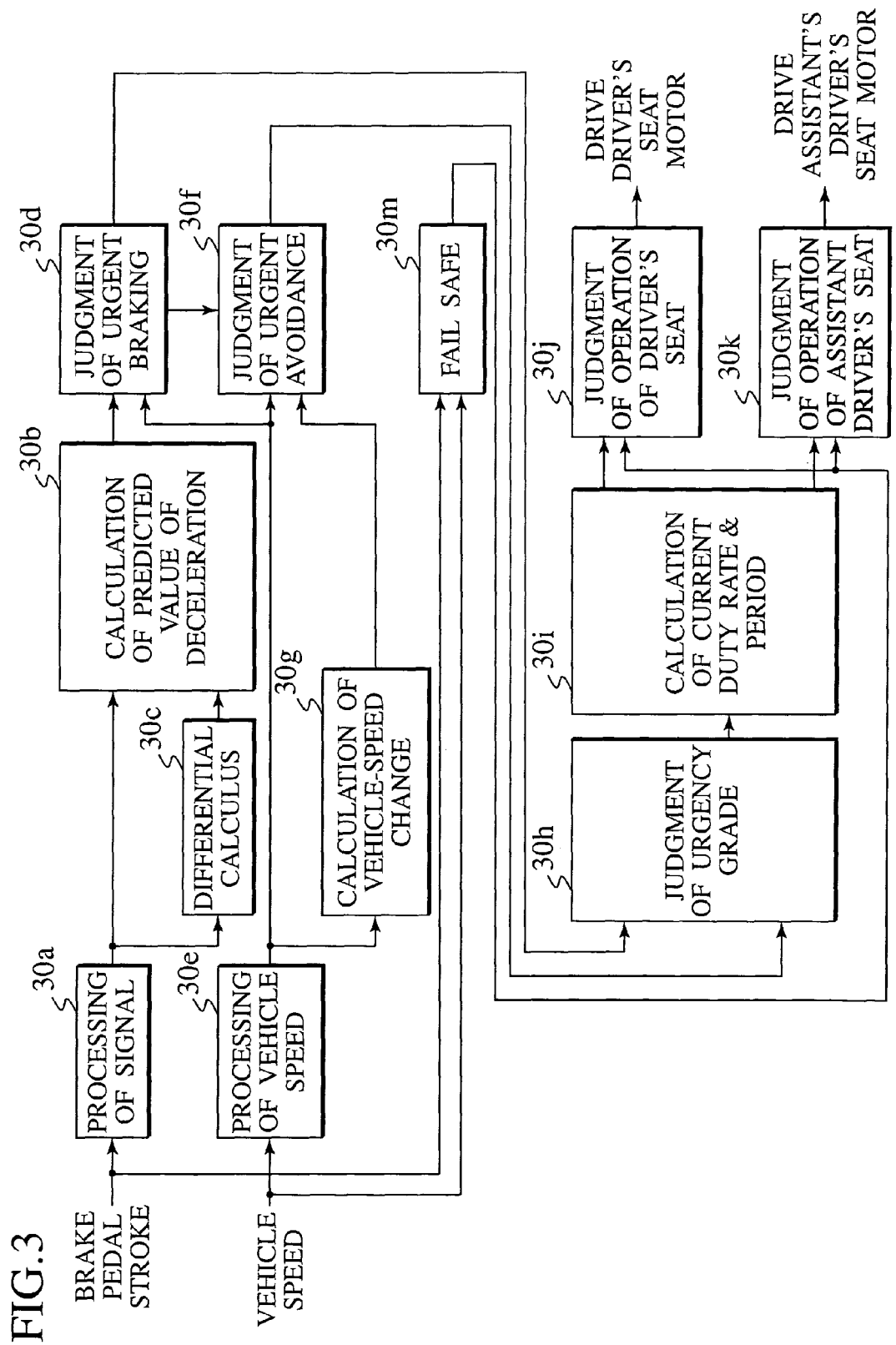
FIG. 3 is a control block diagram of the seatbelt apparatus in accordance with the first embodiment of the invention.

As shown in FIG. 3, in the controller 30, the brake-pedal stroke signal is processed by a circuit 30a and then, the resultant processed signal is outputted to a circuit 30b as correcting unit, directly. Meanwhile, the processed signal is differentiated by a circuit 30c and subsequently outputted to the circuit 30b to calculate a predicted value of deceleration. Then, the predicted value of deceleration is outputted to a circuit 30d.

On the other hand, the detected vehicle speed is processed by a circuit 30e. The resultant processed signal is outputted to the above circuit 30d where it is judged whether or not the vehicle is braking in an emergency by the relationship between the predicted value of deceleration and the present vehicle speed. Additionally, the processed signal by the circuit 30e is outputted to a circuit 30f directly and also a circuit 30g to calculate a change in vehicle speed. After calculation of the change in vehicle speed, it is outputted to the circuit 30f to judge whether a driver is about to avoid an emergency (i.e. judgment of urgency avoidance).

Next, the judgments (signals) at the circuits 30d, 30f are outputted to a circuit 30h to judge the degree of emergency (i.e. urgency). The urgency judged at the circuit 30h is fed to a circuit 30i to calculate a current duty ratio and a current-impressing time. The so-calculated current duty ratio and current-impressing time are respectively inputted to a block 30j to judge the necessity of the operation of the seatbelt apparatus 10 for the driver's seat thereby driving the corresponding motor M and another block 30k to judge the necessity of the operation of the seatbelt apparatus 10 for the assistant driver's seat thereby driving the corresponding motor M.

In the controller 30, meanwhile, the brake-pedal stroke signal and the vehicle-speed signal are together inputted to a circuit 30m for fail-safe judgment. That is, if the brake-pedal stroke sensor 20 and the vehicle speed sensor 21 have malfunctions, the output of signals to the motors M is stopped in accordance with a fail-safe logic.

In this way, the controller 30 is provided for purposes of certainly restraining the passenger H by the corresponding seatbelt apparatus 10 in an emergency, such as vehicle collision. For example, if a driver finds out an obstacle in front of a vehicle during its traveling, an obstacle appears suddenly or if a driver discovers an obstacle with delay, then the driver usually brakes the vehicle abruptly in order to avoid the vehicle's collision. Therefore, the controller 30 of this embodiment is constructed so as to judge such an urgent state of the vehicle owing to the driver's abrupt braking action.

Additionally, owing to the processing of a signal representing the brake-pedal stroke detected in such an emergency, the controller 30 is constructed so as to detect the magnitude of a deceleration expected by the driver, in other words, an expected value (X) of deceleration. Noted that the expected value (X) of deceleration will be referred as "expected deceleration-value (X)", hereinafter.

Figure 9:
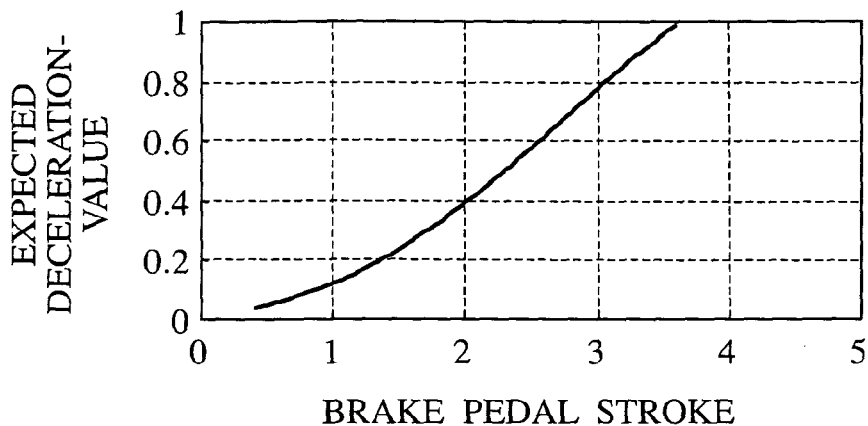
FIG. 9 is a map showing the relationship between a brake pedal stroke and a deceleration expected by a driver, in accordance with the first embodiment of the invention.

About the expected deceleration-value (X), there is established a map as shown in FIG. 9 by previously measuring both the brake-pedal stroke and the magnitude of deceleration when a vehicle is at braking while traveling on a dried road. Upon establishment of this map, the magnitude of deceleration expected by the driver can be obtained from an actual brake stroke by using the map.

Alternatively, the expected deceleration-value (X) may be obtained by the following simple expression (1).

It is noted that, at normal braking, the magnitude of deceleration does not exceed 0.5 G. Therefore, providing that the brake pedal stroke and the expected deceleration-value (X) are linearized each other within a range more than 0.5 G necessary for the judgment of urgent braking, the expected deceleration-value (X) can be expressed as follows.

Expected deceleration-value (X)=(stroke of a brake pedal)×K+A (1)

By the above expression (1), it is possible to judge whether the vehicle is at urgent braking or not. Noted that members "K" and "A" in the expression (1) are constants respectively.

When a vehicle is braking in an emergency, there is a tendency that a driver's stepping speed on a brake pedal becomes faster since a driver usually intends to decelerate a driver's vehicle as soon as possible. Therefore, it is possible to judge whether or not the vehicle is at urgent braking by not only the expected deceleration-value (X) but also a rise of deceleration expected by the driver.

Figure 10A:
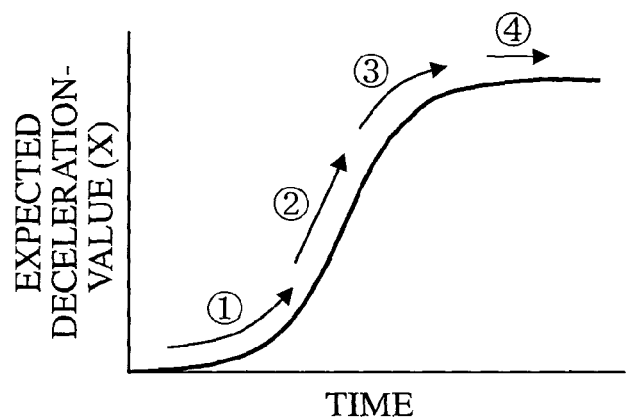
FIG. 10A is a characteristic view showing the time change of an expected deceleration-value at a driver's braking operation, in accordance with the first embodiment of the invention
Figure 10B:
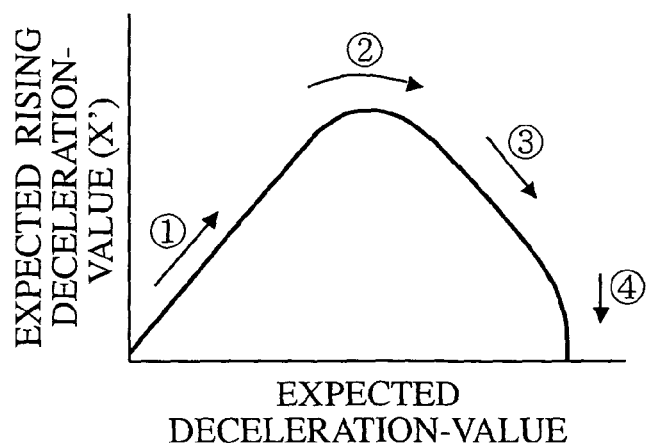
FIG. 10B is a characteristic view showing an expected rising deceleration-value against the expected deceleration-value of deceleration at a driver's braking operation, in accordance with the first embodiment of the invention.

FIG. 10A shows a time-change of the expected deceleration-value (X) which can be obtained by converting the brake pedal stroke at manipulating to brake the vehicle, with the map of FIG. 9. FIG. 10B show an expected deceleration-value (X) at manipulating to brake the vehicle and an expected rising value (X') of deceleration obtained by differentiating the expected deceleration-value (X). Noted that the expected rising value (X') of deceleration will be referred as "expected rising deceleration-value (X')", hereinafter.

In FIGS. 10A and 10B, numeral ① designates a situation where the expected deceleration value (X) increases while the expected rising deceleration-value (X') is rising, numeral ② a situation where the expected deceleration-value (X) increases while the expected rising deceleration-value (X') is constant, numeral ③ a situation where the expected deceleration-value (X) increases while the expected rising deceleration-value (X') is decreasing, and numeral ④ designates a situation where the expected deceleration-value (X) reaches a constant value as a result that the expected rising deceleration-value (X') becomes zero.

Figure 11:
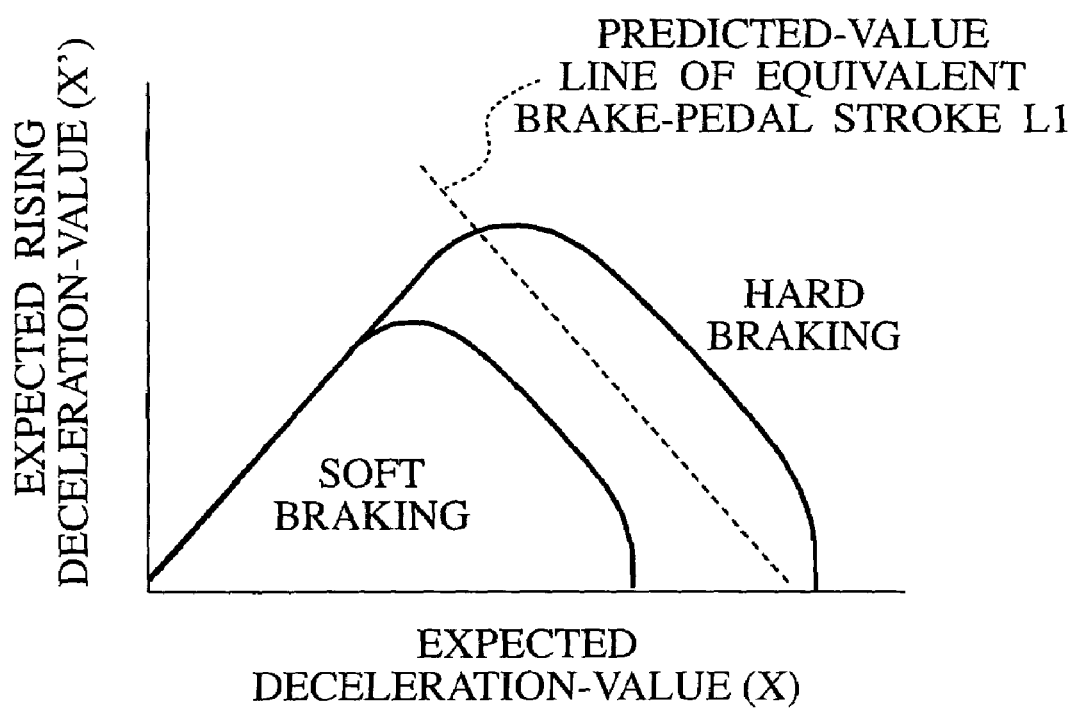
FIG. 11 is a characteristic view showing a threshold value for the expected rising deceleration-value against the expected deceleration-value at a driver's braking operation, in accordance with the first embodiment of the invention.

If the state ③ in FIG. 10A is positioned upper right of FIG. 10B, then it is possible to judge that the vehicle is at urgent braking that so much. Therefore, as shown with a dotted line of FIG. 11 illustrating the relationship between the expected deceleration-value (X) and the expected rising deceleration-value (X'), there is established a downward-sloping line L1 that is nearly paralleled with the state ③ in FIG. 10B, as a threshold-value line. Then, the judgment whether the vehicle is at urgent braking or not can be attained by judging whether a combination of the value (X) and the value (X') is included in an upper-right area of FIG. 11 with respect to the line L1 as a boundary.

That is, according to the embodiment, the detected value by the brake pedal stroke sensor 20 is corrected in anticipation of the future by a predicted-value calculating unit for the deceleration (i.e. the circuit 30b of FIG. 3) so as to hasten the timing of winding of the first pretensioner 16.

In the predicted-value calculating unit for the deceleration, the corrected and predicted value (X⁻) of deceleration as a target can be obtained by the following expression (2) using the expected deceleration-value (X) and the expected rising deceleration-value (X'). Noted that the corrected and predicted value (X⁻) of deceleration will be referred as "predicted deceleration-value (X⁻)", hereinafter.

$$\text{Predicted deceleration-value}(X^-) = \text{Expected deceleration-value}(X) + \text{Expected rising deceleration-value}(X') \times \Delta t \quad (2)$$

In the above expression (2), alphabet "t" denotes a time and "Δt" is specified as a fixed value in this embodiment.

The dotted line L1 of FIG. 11 represents a line where the predicted deceleration-value (X⁻) obtained by the expression (2) becomes a constant value.

Accordingly, in this embodiment, the judgment whether the vehicle is at urgent braking or not is accomplished by judging whether the predicted deceleration-value (X⁻) does exceed a predetermined threshold value. This predicted deceleration-value (X⁻) is a value that is obtained by expecting an expected deceleration-value (X) after a time Δt has passed since the expected deceleration-value (X) and the expected rising deceleration-value (X') at that time.

In the rising process of the deceleration, the predicted deceleration-value (X⁻) is corrected so as to be larger than the expected deceleration-value (X). The finish value of the rising deceleration is identical to the finish value of the expected deceleration-value (X).

Accordingly, the predicted deceleration-value (X⁻) allows the expected deceleration-value (X) to be anticipated at an early timing with high accuracy.

Figure 4:
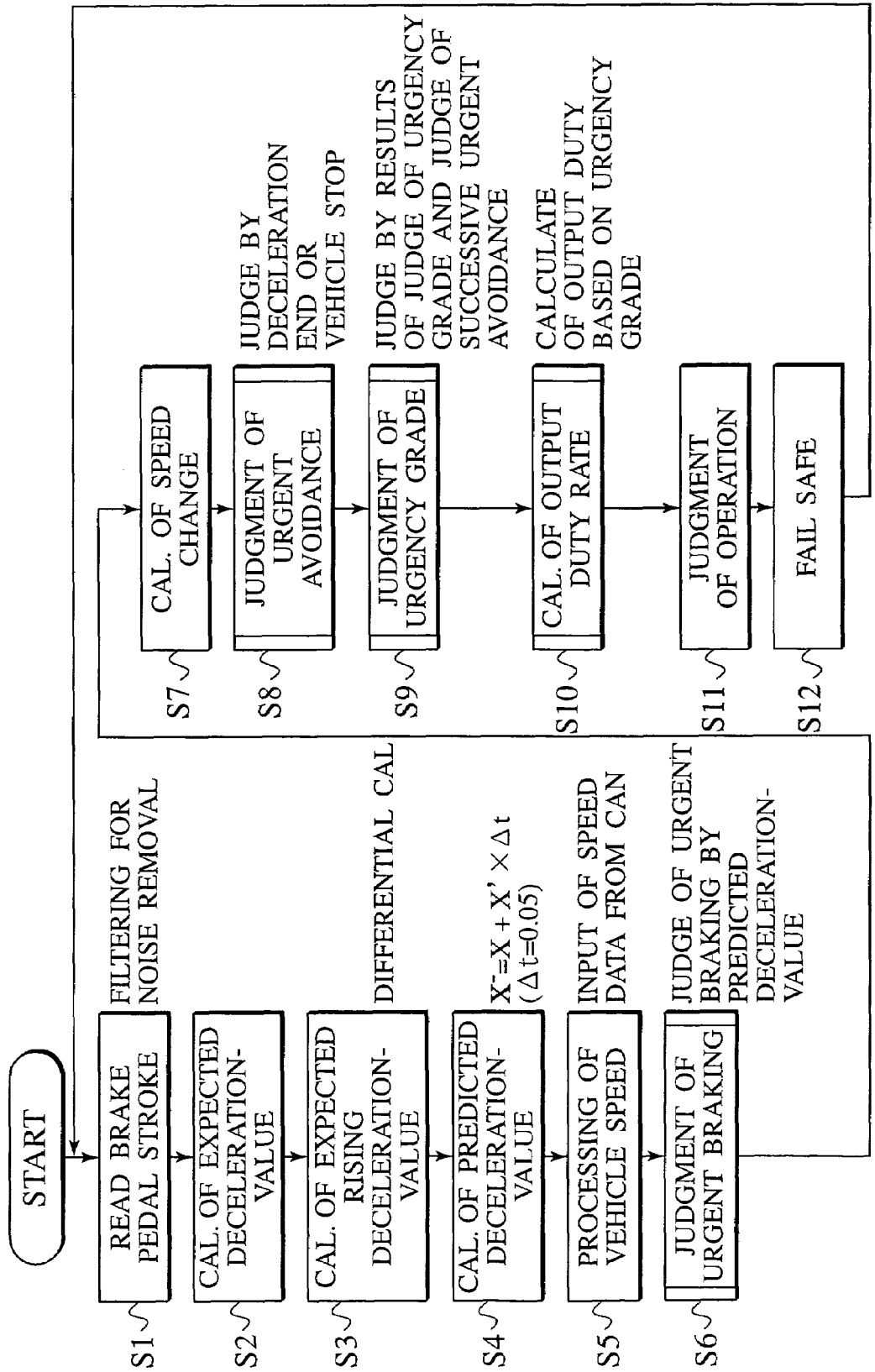
FIG. 4 is a view explaining a main routine of a flow chart executing the operation of the controller in accordance with the first embodiment of the invention.

The operation of the controller 30 is performed in accordance with the flow chart of FIG. 4.

At step S1, it is executed to read a brake-pedal stroke in. After completing to filter the so-read stroke for its noise removal, the routine goes to step S2 to obtain an expected deceleration-value (X) corresponding to the brake-pedal stroke by means of the map of FIG. 9. At next step S3, the expected deceleration-value (X) is differentiated to obtain an expected rising deceleration-value (X').

This differential calculus at step S3 is accomplished by means of HPF (High Pass Filter) whose cutoff frequency is set to about 20 Hz. Without being limited to HPF only, it may be replaced by an element whose phase and gain are equivalent to the differential operation of HPF in a frequency range where the change of a driver's brake-manipulating amount (i.e. pedal stroke or expected deceleration-value estimated by the pedal stroke) per unit of time at a vehicle's urgent braking distributes.

At step S4, it is carried out to calculate a predicted deceleration-value ($X^-$) by both of the expected deceleration-value (X) and the expected rising deceleration-value (X') and the expression (2).

Hereat, a micro-time less than, for example, 0.1 sec. is established to the member $\Delta t$ in the expression (2). At next step S5, it is executed to read a vehicle-speed data or signal from the CAN·I/F 34 thereby processing the data or signal. Then, the routine goes to step S6 where it is judged in accordance with the sub-routine of FIG. 5 whether or not a driver's vehicle is now braking in an emergency by the predicted deceleration-value ($X^-$) by and the so-obtained vehicle speed.

Figure 5:
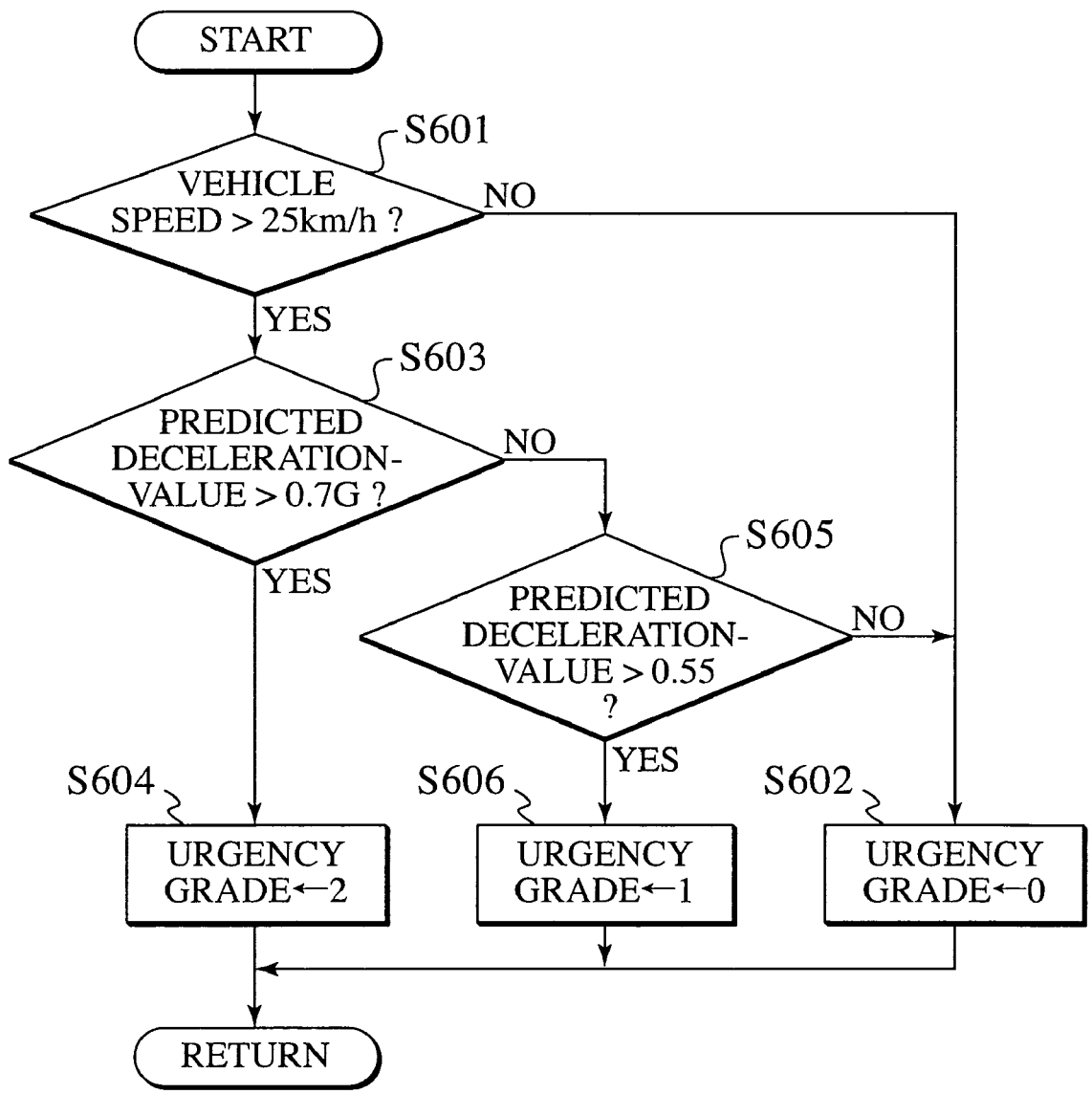
FIG. 5 is a view explaining a sub-routine of the judgment of an urgent braking in accordance with the first embodiment of the invention.

In FIG. 5, the judgment of urgent braking is performed as follows. First, at step S601, it is judged whether or not the vehicle speed is more than e.g. 25 km/h. If the vehicle speed is less than 25 km/h, the seatbelt apparatus 10 has only to restrain a passenger H through the webbing 11 by its normal restraining force because a collision energy is small.

In such a low-speed condition, without executing the judgment of urgent braking in view of avoiding an unnecessary power consumption, the routine goes to step S602 to establish the urgency grade of "0 (zero)".

While, if the vehicle speed is more than 25 km/h (i.e. middle speed or high speed), then the routine goes to step S603 to compare the predicted deceleration-value ($X^-$) with 0.7 G. If the predicted deceleration-value ($X^-$) is more than 0.7G, the routine goes to step S604 to establish the urgency grade (urgency flag) of "2" upon judgment of the urgent braking.

At step S603, if the predicted deceleration-value ($X^-$) is less than 0.7 G, then the routine goes to step S605 to further compare the predicted deceleration-value ($X^-$) with 0.55 G. If the predicted deceleration-value ($X^-$) is more than 0.55 G, the routine goes to step S606 to establish the urgency grade (urgency flag) of "1" upon judgment of the possibility of urgent braking. While, if the predicted deceleration-value ($X^-$) is less than 0.55 G, the routine goes to step S602 to establish the urgency grade of "0" upon judgment of the normal braking and thereafter, the routine returns to the main routine of FIG. 4.

Next, in the main routine of FIG. 4, it is executed to calculate the change in vehicle speed per unit time at step S7. After that, the routine goes to step S8 to perform an urgent avoidable judgment in accordance with the sub-routine of FIG. 6.

Figure 6:
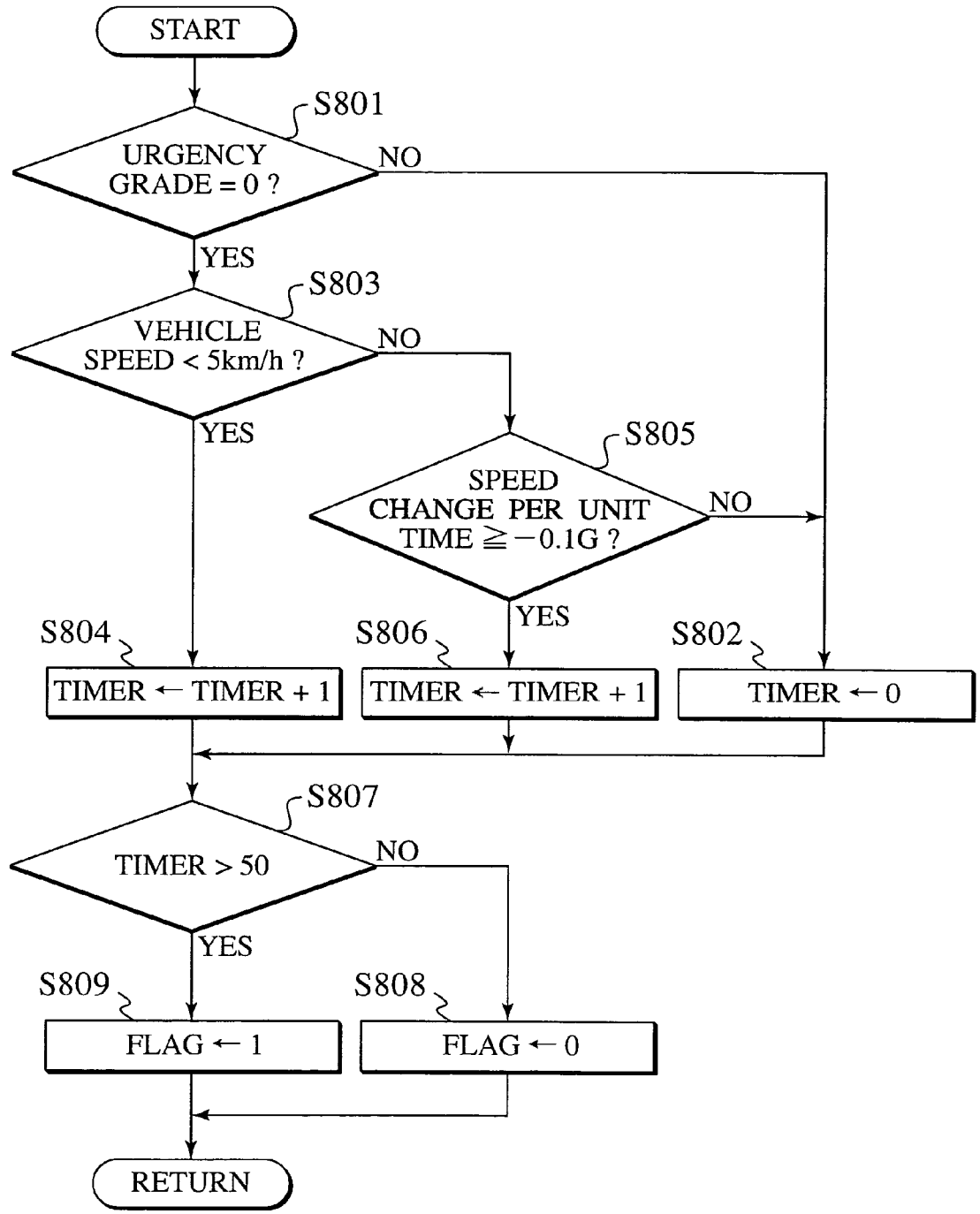
FIG. 6 is a view explaining a sub-routine of the judgment of an urgency for in accordance with the first embodiment of the invention.

In the urgent avoidable judgment shown in FIG. 6, at step S801, it is executed to judge whether the urgency grade determined by the sub-routine of FIG. 5 is "0" or not. When the urgency grade is not "0", it is judged that the vehicle is continuously braking in an emergency and the routine goes to step S802 to set a timer value to zero.

In case of the urgency grade of "0", at step S803, it is judged whether the vehicle speed is less than e.g. 5 km/h. If the vehicle speed is less than e.g. 5 km/h, then the routine goes to step S804 to increase the value of the timer to count a period for judging whether the vehicle is coming to a standstill, by the increment of counter number "1".

At step S803, if the vehicle speed is more than 5 km/h (i.e. the judgment of No), the routine goes to step S805 where it is examined whether the change in vehicle speed per unit time is more than −0.1 G or not. If the change is more than −0.1 G, the routine goes to step S806 to increase the value of the above timer by counter number "1". On the other hand, if the change is less than −0.1 G, the routine goes to step S802 to set the timer 6 to "0".

On determination of the value of the timer at steps S802, S804 and S806, the routine goes to step S807 where it is judged whether the value of the timer is more than 50 (e.g. 0.5 sec., if a sampling time period is 10 m sec.) or not.

If the value of the timer is less than 50 (0.5 sec.), it is judged that the vehicle is in the course of decelerating and therefore, the routine goes to step S808 to set a flag to "0". While, if the value of the timer is more than 0.5 sec., it is judged that the vehicle comes to a standstill or the deceleration is finished and therefore, the routine goes to step S809 to set the above flag to "1" and returns to the main routine of FIG. 4.

Although there are established, in the sub-routine of FIG. 6, a vehicle speed of 5 km/h for the judgment of a vehicle's standstill, a threshold value of −0.1 G for the judgment of completion of deceleration and a judgment period of 0.5 sec., of course, these numerical values are nothing but examples. Therefore, without being limited to these values only, actual numerical values can be determined by the resolving power of a vehicle speed sensor and the characteristics of a vehicle itself.

Figure 7:
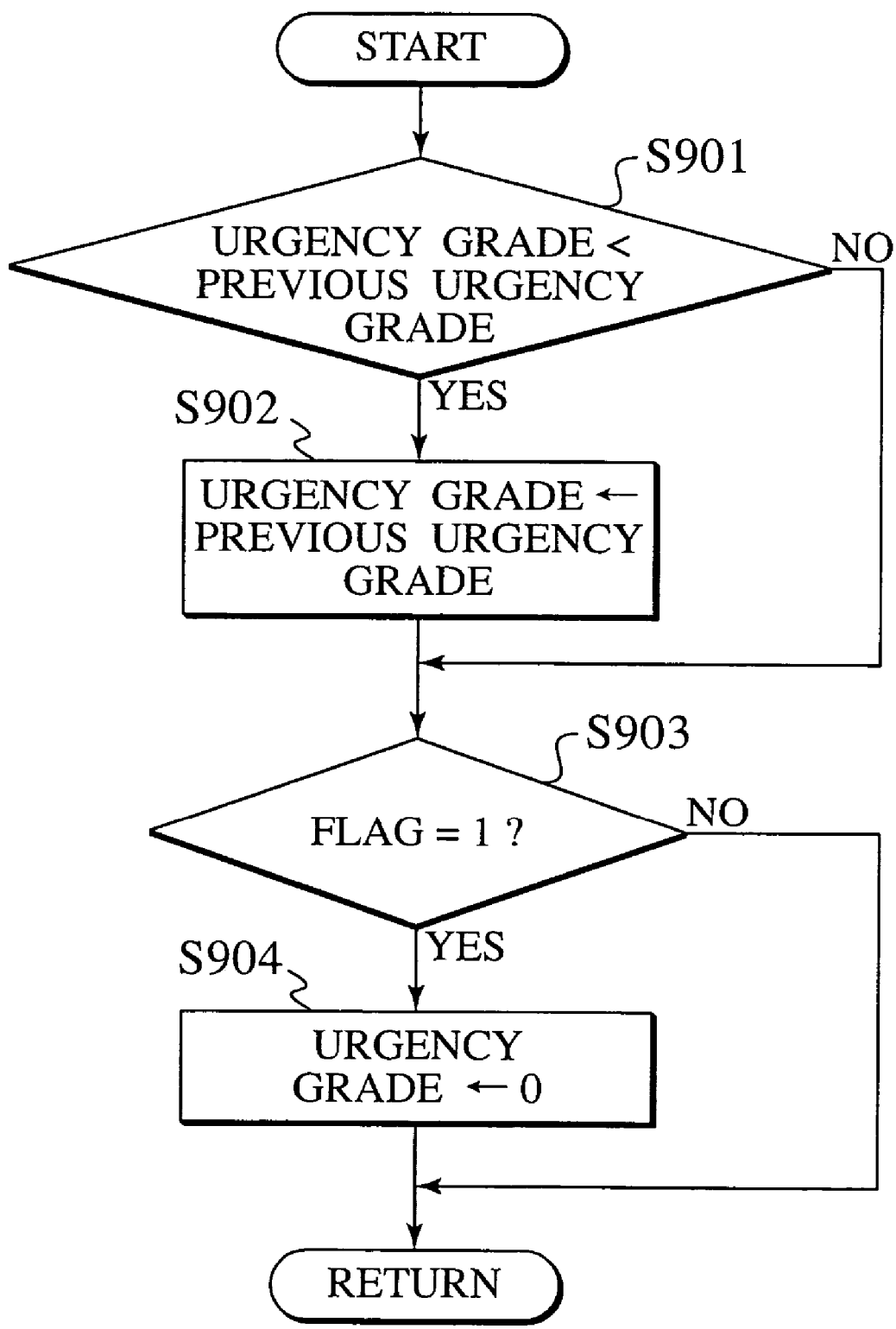
FIG. 7 is a view explaining a sub-routine of the judgment of an urgency grade in accordance with the first embodiment of the invention.

Next, in the main routine of FIG. 4, it is executed at step S9 to judge the urgency grade based on the results of the judgment of urgent braking at step S6 and the urgent avoidable judgment at step S8, in accordance with the sub-routine of FIG. 7.

In the judgment of urgency grade of FIG. 7, at step S901, it is judged whether the urgency grade obtained by the judgment of urgent braking in the sub-routine of FIG. 5 is less than the previous urgency grade in the previous routine or not. If the present urgency grade is less than the previous urgency grade, the routine goes to step S902 to maintain the previous urgency grade and further goes to step S903.

The reason to maintain the previous urgency grade at step S902 when the present urgency grade is less than the previous urgency grade is that once the vehicle is judged to be at urgent braking, it is regarded that even if the braking power and the deceleration is lowered, the state of urgent braking is continued during the vehicle's braking. In order to establish the urgency grade of "0" in the state of urgent braking, the establishment requires only the result of judging the avoidance of urgency.

At step S901, if it is judged that the present urgency grade is not less than the previous urgency grade, the routine goes to step S903 to judge whether or not the flag determined by the urgency-avoidance judgment of FIG. 6 is equal to "1". In case of the flag of "1", it is executed to set the urgency grade of "0" at step S904. While, if the flag is not "1", then the routine goes to the main routine of FIG. 4.

Next, at step 10 in the main routine of FIG. 4, it is executed to calculate a current duty ratio to be outputted to each motor M, in other words, to determine the rotating speed of the motor M, corresponding to the urgency grade determined at step S9. The calculation of the current duty ratio is carried out in accordance with the sub-routine of FIG. 8.

Figure 8:
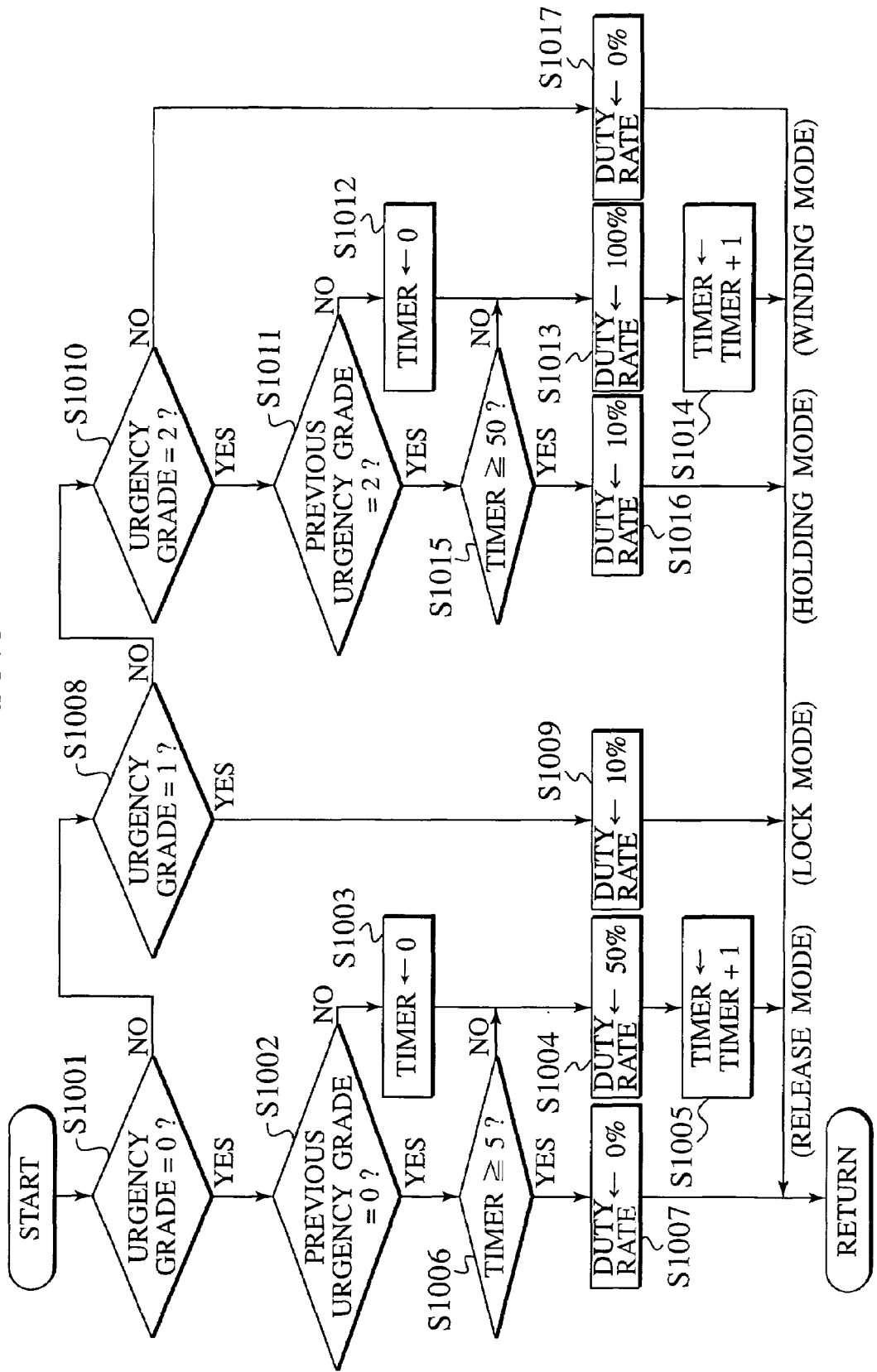
FIG. 8 is a view explaining a sub-routine of the calculation of the output duty ratio in accordance with the first embodiment of the invention.

In FIG. 8, at step S1001, it is judged whether the urgency grade is "0" or not. When the judgment at step S1001 is Yes, the routine goes to step S1002 where it is judged whether the previous urgency grade is "0" or not. If the previous urgency grade is not "0", it is executed to initialize the value of a timer (counter) to "0" at step S1003 and further set the duty ratio of −50% for reverse command at step S1004, thereby releasing the restraining force by the winding of the webbing 11. Thereafter, at next step S1005, the value of the timer is increased by "1".

On judgment of the previous urgency grade of "0" at step S1002, if the value of the timer does not exceed 5 ms. at step S 1006, then the routine goes to step S1004 and next step S1005 where the duty ratio of −50% is generated in the reverse command and further, the value of the timer is increased by "1". While, if value of the timer exceeds 5 ms. at step S 1006, then the routine goes to step S1007 to set the duty ratio of 0% and finish the releasing operation against the tension of the webbing 11.

Next, when it is judged that the urgency grade is "1" at step S1008, the routine goes to step S1009 to set the duty ratio of 10%. As a result, the webbing 11 is not pulled out of the retractor 12 though it is not withdrawn thereinto strongly, so that the present position of the webbing 11 can be maintained.

At step S1010, it is judged whether the urgency grade is "2" or not. When the judgment at step S1010 is Yes, the routine goes to step S1011 where it is judged whether the previous urgency grade is "2" or not. If the previous urgency grade is not "2", it is executed to initialize the value of the timer to "0" at step S1012 and further set the duty ratio of 100% to the winding direction of the webbing 11 at step S1013, thereby starting to wind the webbing 11. Thereafter, at next step S1014, the value of the timer is increased by "1".

On judgment of the previous urgency grade of "2" at step S1011, if the value of the timer does not exceed 50 ms. at step S 1015, then the routine goes to step S1013 and next step S1014 where the duty ratio of 100% is generated to continue the winding of the webbing 11 in the winding direction and further, the value of the timer is increased by "1".

While, if value of the timer exceeds 50 ms. at step S 1015, then the routine goes to step S1016 to set the duty ratio of 10% and finish the winding operation of the webbing 11 to hold it in the position.

Next, when it is judged that the urgency grade is not "2" at step S1010, the routine goes to step S1017 to set the duty ratio of 0%.

Although there are established, in the sub-routine of FIG. 8, the duty ratio of 50% (step S1004) in the reverse (rewinding) direction, 100% (step S1013) in the winding direction and 10% (steps S1019 and S1016) in the winding direction and the duty ratio holding times of 5 ms. (step S1006) and 50 ms. (step S1015), of course, these numerical values are nothing but examples. Therefore, without being limited to these values only, actual numerical values can be determined by the characteristics of a vehicle itself.

After completing the calculation of the output duty ratio by the sub-routine of FIG. 8, the routine returns to the main routine of FIG. 4. At step S11, it is executed to judge the operating situation of the respective sensors and the respective signals. If there is an abnormality in the operating situation, then the above-mentioned fail-safe operation is carried out at step S12 and the routine returns to step S1.

Thus, in the seatbelt apparatus 10 constructed above, the restraining of each passenger H by the webbing 11 is carried out by the motor M forming the first pretensioner 16. At a vehicle collision, the passenger H is certainly restricted by the second pretensioner 17 finally. The winding and rewinding operations of the retractor 12 against the webbing 11 before a collision (including the normal traveling condition) are carried out since the controller 30 controls the rotating direction and speed of the motor M on the ground of the decelerating signal and the vehicle speed signal outputted from the brake-pedal stroke sensor 20 as the deceleration detecting sensor.

According to this embodiment, since the future anticipation by using a value detected by brake-pedal stroke sensor 20 at the stage of urgency avoidance before a collision and the correction of the so-detected value allow the timing of judging the urgency to be advanced thereby causing the operative timing of the motor M to be advanced, it is possible to restrain the passenger's body certainly without enhancing the restraining force by the webbing 11 unnecessarily, in an emergency.

Further, since the correcting unit corrects the detected value of the deceleration detecting sensor so as to be larger than either an actual deceleration of the vehicle or a value in correlation with the actual deceleration, by determining a threshold value based on the corrected deceleration, it is possible to judge whether the vehicle is braking in an emergency or not with ease. Therefore, it is possible to accomplish the winding control of the seatbelt apparatus 10 when avoiding an emergency, precisely and rapidly.

Further, the correcting unit is adapted so as to provide the corrected and predicted deceleration-value ($X^-$) as a target by the following expression (2) using the expected deceleration-value (X) that is detected by the deceleration detecting sensor and also the expected rising deceleration-value (X') that is obtained by differentiating the expected deceleration-value (X).

$$(X^-) = (X) + (X') \times \Delta t \quad (2)$$

That is, since the predicted deceleration-value ($X^-$) of the deceleration after a time $\Delta t$ has passed since the start of deceleration is provided with high accuracy, it is possible to perform the winding control of the seatbelt apparatus 10 when avoiding an emergency, in proper owing to the establishment of a threshold value for detecting the possibility of a vehicle collision by judging whether the vehicle is braking in an emergency or not.

Further, since the deceleration detecting sensor is formed by the brake-pedal stroke sensor 20 for detecting the driver's stepping stroke, it is possible to accomplish the winding control of the seatbelt apparatus 10 of the invention while making use of the existing brake pedal.

Additionally, since the member "$\Delta t$" in the above expression (2) is set under 0.1 sec., it is possible to obtain an predicted deceleration value after a time $\Delta t$ has passed, with high accuracy.

Since the member "$\Delta t$" is a fixed value, it is possible to build the control logic with ease.

Figure 13:
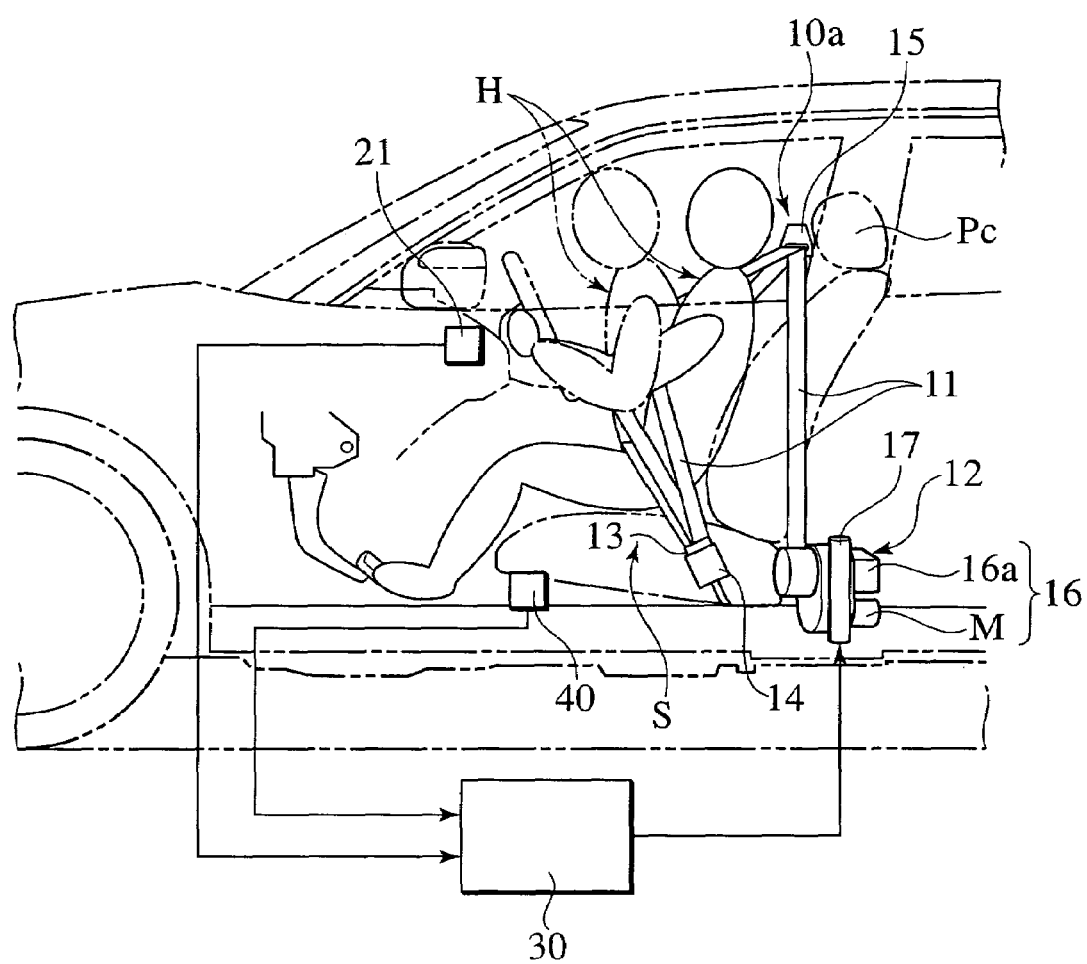
FIG. 13 is a schematic structural view of a seatbelt apparatus on a vehicle, in accordance with the second embodiment of the invention.

FIG. 13 shows the second embodiment of the present invention. In this embodiment, elements similar to those of the first embodiment are indicated with the same reference numerals and their overlapping descriptions are eliminated.

FIG. 13 is a schematic structural view of a seatbelt apparatus installed in a vehicle. In the second embodiment, the seatbelt apparatus 10a employs a front-to-back (lengthwise) deceleration sensor 40 for detecting a front-to-back deceleration of the vehicle directly.

According to the second embodiment of the invention, providing that "X" represents the front-to-back deceleration directly detected by the front-to-back deceleration sensor 40, "X'" a rising of the deceleration obtained by differentiating the front-to-back deceleration X, and "$X^-$" represents a predicted deceleration-value as a target, the predicted deceleration-value ($X^-$) can be calculated by the following expression.

$$X^- = X + X' + \Delta t \quad (3)$$

This expression (3) corresponds to the expression (2) of the first embodiment. By judging whether a vehicle is braking in an emergency while adopting the magnitude of the predicted deceleration obtained by the expression (3) as a threshold value, it is possible to advance the judgment timing of urgent avoidance.

Therefore, since the front-to-back deceleration sensor 40 is adapted so as to directly detect the deceleration of the vehicle in the seatbelt apparatus 10a of the second embodiment, it is possible to accomplish the exact winding of the webbing 11 of the seatbelt apparatus 10a by performing the judgment of urgent braking more accurately.

Figure 14:
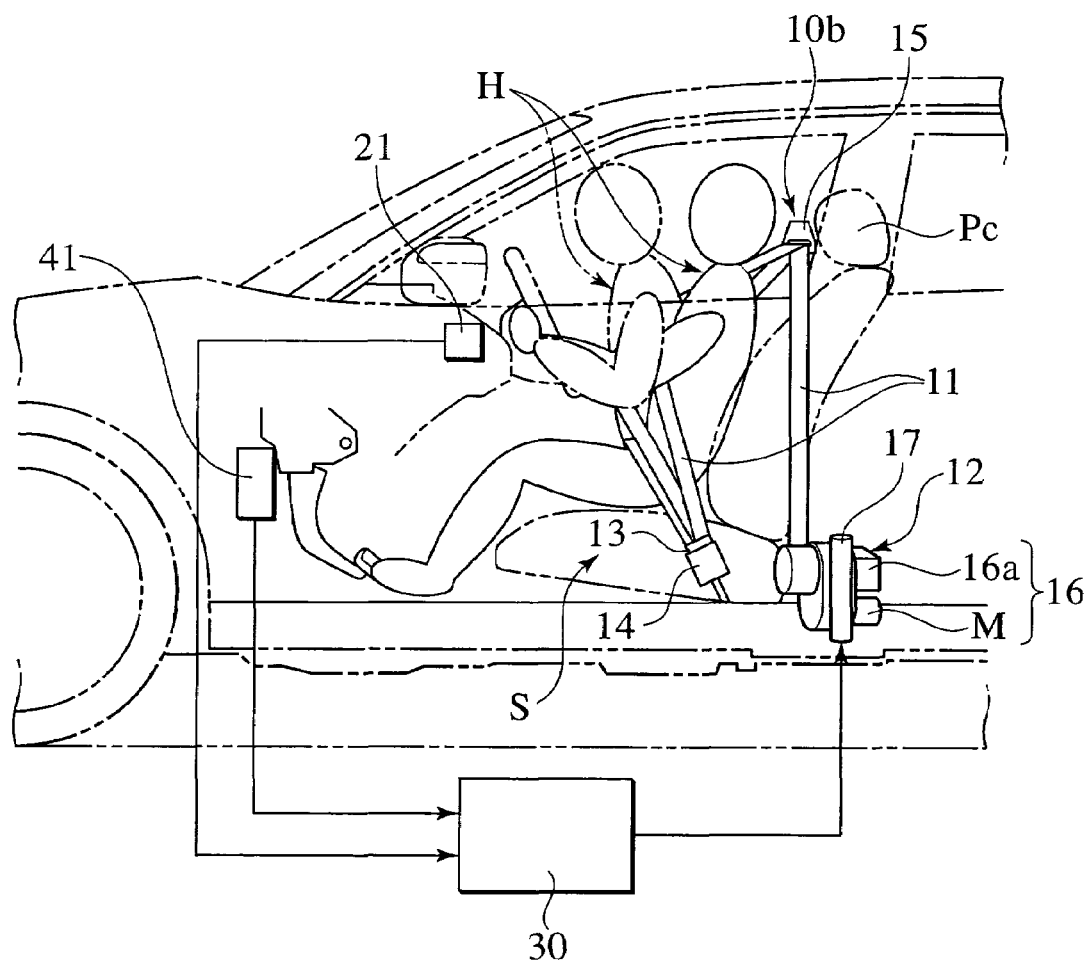
FIG. 14 is a schematic structural view of a seatbelt apparatus on a vehicle, in accordance with the third embodiment of the invention.
Figure 15:
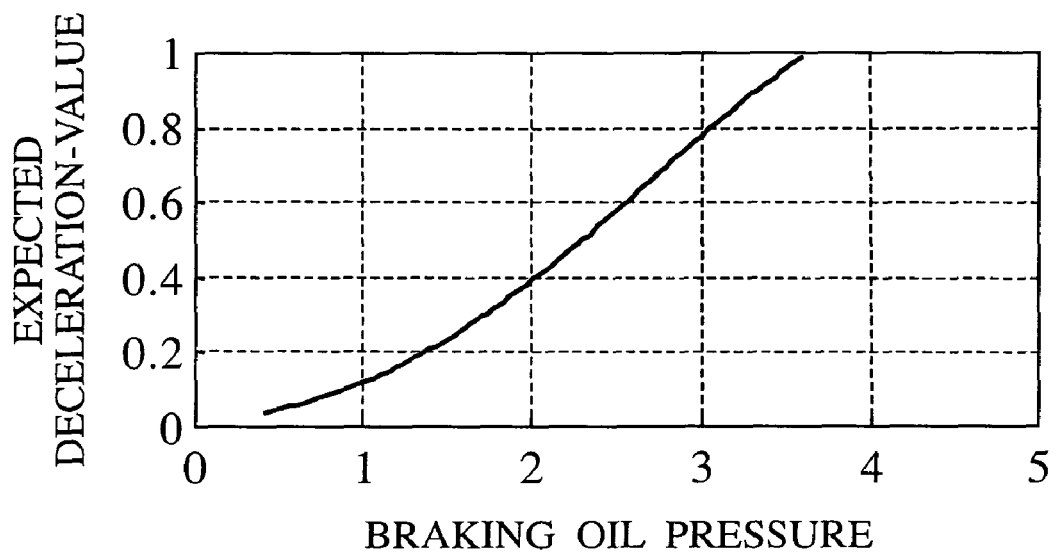
FIG. 15 is a map showing the relationship between a brake oil pressure and a deceleration-value expected by a driver, in accordance with the third embodiment of the invention.

FIGS. 14 and 15 show the third embodiment of the invention. In this embodiment, elements similar to those of the first embodiment are indicated with the same reference numerals and their overlapping descriptions are eliminated.

FIG. 14 is a schematic structural view of a seatbelt apparatus installed in a vehicle. FIG. 15 is a map showing the relationship between a brake oil pressure and a deceleration that a driver expects.

In the third embodiment, the seatbelt apparatus 10b employs a stepping force detecting sensor 41 (as the deceleration detecting sensor) for detecting a driver's stepping force on a brake pedal.

According to the third embodiment of the invention, there is previously provided a map for converting the brake oil pressure to an expected value of deceleration, as shown in FIG. 15. In order to obtain a predicted deceleration-value $(X^-)$, it is carried out to obtain an expected deceleration-value $(X)$ on a basis of the above map and further calculate the predicted deceleration-value $(X^-)$ by the expected deceleration-value $(X)$ and the expression (2) of the first embodiment.

Owing to the adoption of the stepping force detecting sensor 41 as the deceleration detecting sensor, by making use of a phenomenon that the stepping force is increased when a driver brakes a vehicle abruptly, it is possible to judge the urgency avoidance from a point of starting to step on a brake pedal, thereby allowing of the precise winding control of the webbing at leisure.

Figure 16:
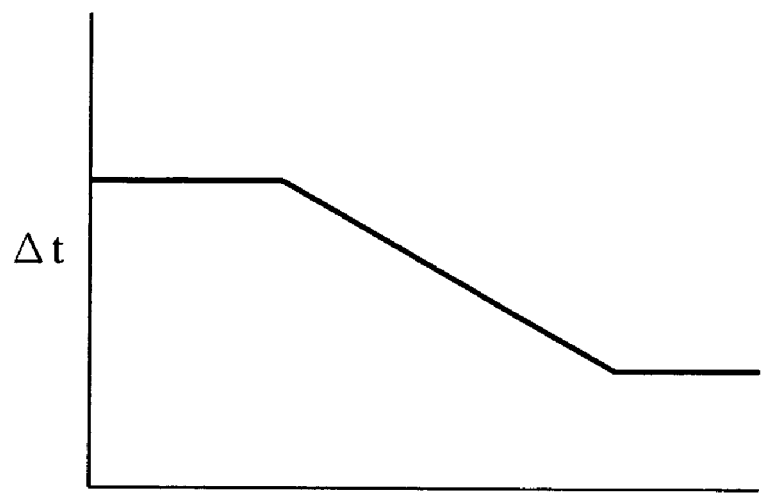
FIG. 16 is a map showing the relationship between a brake stroke and Δt, in accordance with the fourth embodiment of the invention.

FIG. 16 shows the fourth embodiment of the present invention. According to this embodiment, the member $\Delta t$ of the expression (2) of the first embodiment varies corresponding to a brake pedal stroke (i.e. driver's manipulating amount to a brake pedal).

FIG. 16 is a map showing the relationship between the brake pedal stroke and $\Delta t$. In the map, when the brake pedal stroke is small, there is established a large for $\Delta t$. As the brake pedal stroke gets larger, the value of $\Delta t$ is gradually decreased.

Therefore, according to the fourth embodiment, since the detected value of the deceleration detecting sensor is greatly corrected while the driver's manipulating amount is small, the timing of judging the urgent braking can be advanced furthermore. While, since the value of $\Delta t$ becomes smaller when the driver's manipulating amount gets larger, it is possible to prevent the predicted deceleration-value $(X^-)$ from exceeding the expected deceleration-value $(X)$ or the actual deceleration-value greatly.

Therefore, it is possible to establish the optimum $\Delta t$ corresponding to the brake pedal stroke, whereby the timing of braking in an emergency can be hastened and the accuracy of the judgment of urgent braking can be improved.

Figure 17:
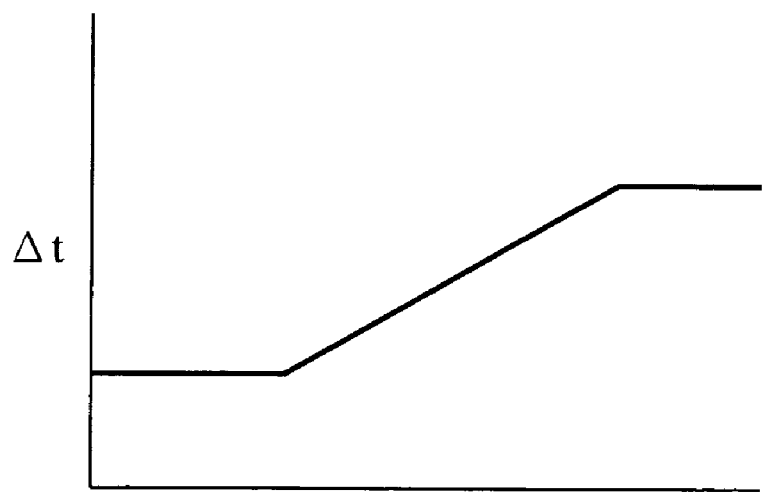
FIG. 17 is a map showing the relationship between a vehicle speed and Δt, in accordance with the fifth embodiment of the invention.

FIG. 17 shows the fifth embodiment of the present invention where the value of $\Delta t$ changes corresponding to a vehicle speed.

FIG. 17 is a map showing the relationship between the vehicle speed and $\Delta t$. In the map, when a vehicle travels at low speed, there is established a small value for $\Delta t$. As the vehicle travels faster from low speed to middle speed, the value of $\Delta t$ is gradually increased.

If the vehicle speed is small, there is a high possibility of the vehicle's traveling on the street in the town. Conversely, the vehicle speed is large, there is a high possibility of the vehicle's traveling in the suburb. Under such a situation, it can be expected that a driver's stepping speed of a brake pedal gets faster when the vehicle travels at a low speed, in comparison with the driver's stepping speed in case of traveling at a high speed.

Therefore, it is possible to establish the optimum $\Delta t$ corresponding to the vehicle speed, whereby the timing of braking in an emergency can be hastened and the accuracy of the judgment of urgent braking can be improved as well.

Although the value of $\Delta t$ is changed corresponding to two conditions of a brake pedal stroke (in the fourth embodiment) and a vehicle speed (in the fifth embodiment), there may be selected at least any one of other conditions, for example, vehicle weight, traveling filed, weather, time zone, deceleration, etc.

In one modification, it is desirable to change the value of $\Delta t$ corresponding to the vehicle weight changeable due to the number of passengers and the laden weight. It is noted that if the vehicle weight is large, then the brake pedal stroke grows large to accomplish the same deceleration. Therefore, it is established to increase the value of $\Delta t$ when the vehicle weight is small and also established to decrease the value of $\Delta t$ when the vehicle weight is large conversely.

In another modification, it is desirable to change the value of $\Delta t$ corresponding to various traveling places, for example, street, suburb, free way, etc. On condition of using an automotive navigation system to receive a detailed traveling place where a vehicle is traveling at present, it is established to decrease the value of $\Delta t$ when the vehicle is on the street and also established to increase the value of $\Delta t$ when the vehicle is on a freeway.

In a further modification, it is desirable to change the value of $\Delta t$ corresponding to the weather. It is noted that the road friction coefficient in wet weather is smaller than that in fine weather. Therefore, with respect to the same brake pedal stroke, the resulting deceleration in case of a vehicle's traveling in wet weather is small in comparison with that in case of the vehicle's traveling in fine weather. In the former case, on condition of inputting an operational signal from a windshield wiper of the vehicle, it is established to increase the value of $\Delta t$ when the windshield wiper is operated. In connection, it is further preferable to change the value of $\Delta t$ corresponding to the sweeping speed of the wiper.

In a still further modification, it is desirable to change the value of $\Delta t$ corresponding to the time zone when a vehicle is traveling. It is noted that when the vehicle is traveling in the night, there is a tendency that a driver is late for discovering an obstacle due to driver's deteriorated visibility, in comparison with a situation where the vehicle is traveling in the daytime. Therefore, it is established to decrease the value of $\Delta t$ when turning on a head light switch. In connection, on condition of turning on a small light switch only, it is further preferable to establish a value of $\Delta t$ between a value of $\Delta t$ when turning on the head light switch and another value of $\Delta t$ when turning off the head light switch.

Further, it is desirable to change the value of Δt corresponding to the deceleration of a vehicle.

In the above-mentioned way, by changing the value of Δt corresponding to at least any one of various conditions, that is, brake pedal stroke, vehicle speed, vehicle weight, traveling place, weather, time zone, deceleration, etc., it is possible to establish the optimum value of Δt corresponding to the condition of a vehicle and the traveling condition, whereby the timing of braking in an emergency can be hastened and the accuracy of the judgment of urgent braking can be improved as well.

Figure 18:
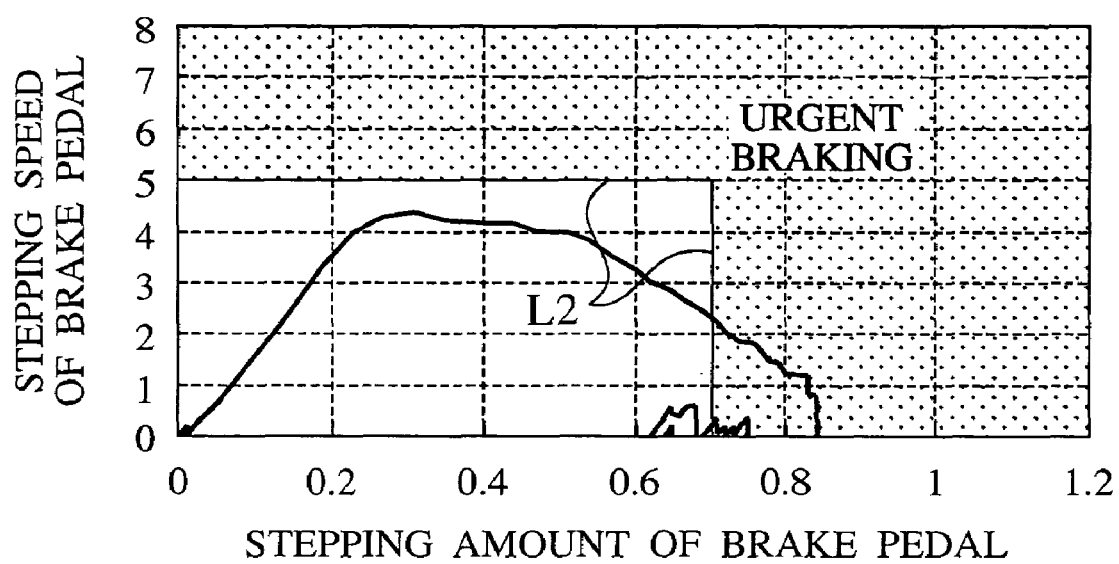
FIG. 18 is a map showing the relationship between a stepping amount of a brake pedal and a stepping speed thereof, in accordance with the other embodiment of the invention.

FIG. 18 is a map showing the relationship between the brake pedal stepping amount and the brake pedal stepping speed. Owing to the formation of an urgent braking area in the map on establishment of threshold values L2 under the above relationship, it is possible to carry out the judgment of urgent braking.

Meanwhile, it will be understood by those skilled in the art that the foregoing descriptions are nothing but some embodiments of the disclosed seatbelt apparatus for a vehicle. Besides these embodiments, various changes and modifications may be made to the present invention without departing from the spirit and scope of the invention.

According to the present invention, since the correction of a detected value of the deceleration detecting sensor in anticipation of future allows the judgment timing for urgency to be advanced to hasten the operational timing of the first pretensioner, it is possible to restrain a passenger's body in an emergency certainly without enhancing a restraining force of a webbing unnecessarily.

Japanese Patent Application No. 2002-286402, filed on Sep. 30, 2002, is incorporated herein by reference in its entirety.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the invention as set forth in the appended claims.

What is claimed is:

1. A seatbelt apparatus for a vehicle, comprising:
a webbing for restraining a passenger on a seat;
a retractor for winding and rewinding the webbing;
a first pretensioner that allows the retractor to wind the webbing thereinto or rewind the webbing therefrom;
a second pretensioner that applies a tension to the webbing in an emergency for the vehicle, thereby restraining the passenger through the webbing;
a deceleration detecting sensor for detecting a decelerating state of the vehicle; and
a controller for controlling the operations of the first pretensioner and the second pretensioner corresponding to a detected value from the deceleration detecting sensor,
wherein the controller includes a correcting unit for correcting the detected value of the deceleration detecting sensor in anticipation of a future condition so as to advance a timing of the first pretensioner to wind the webbing.

2. The seatbelt apparatus for the vehicle of claim 1, wherein the correcting unit corrects the detected value of the deceleration detecting sensor so that the detected value becomes larger than an actual deceleration of the vehicle or a value in correlation with the actual deceleration.

3. The seatbelt apparatus for the vehicle of claim 2, wherein the correcting unit corrects the detected value of the deceleration detecting sensor by an expression of:

$$X^- = X + X' \times \Delta t$$

where X represents the detected value of the deceleration detecting sensor, X' a differential value of the detected value X, X⁻ a corrected value of deceleration and Δt represents a time for anticipation.

4. The seatbelt apparatus for the vehicle of claim 1, wherein the deceleration detecting sensor comprises a sensor for detecting a driver's stepping stroke of a brake pedal of the vehicle.

5. The seatbelt apparatus for the vehicle of claim 1, wherein the deceleration detecting sensor comprises a sensor for detecting a deceleration of the vehicle.

6. The seatbelt apparatus for the vehicle of claim 1, wherein the deceleration detecting sensor comprises a sensor for detecting a driver's stepping force applied to a brake pedal of the vehicle.

7. The seatbelt apparatus for the vehicle of claim 3, wherein the member Δt is a time period less than 0.1 seconds.

8. The seatbelt apparatus for the vehicle of claim 3, wherein the member Δt is a fixed value.

9. The seatbelt apparatus for the vehicle of claim 3, wherein the member Δt is a parameter that is changeable corresponding to at least any one of a stepping amount to a brake pedal, vehicle speed, vehicle weight, traveling place, weather, time zone and deceleration.

10. The seatbelt apparatus for the vehicle of claim 2, wherein the correcting unit corrects the detected value of the deceleration detecting sensor by an expression of:

$$X^- = X + X' + \Delta t$$

where X represents the detected value of the deceleration detecting sensor, X' a differential value of the detected value X, X⁻ a corrected value of deceleration and Δt represents a time for anticipation.

11. A seatbelt apparatus for a vehicle, comprising:
a webbing for restraining a passenger seated on a seat;
a retractor for winding and rewinding the webbing;
a first pretensioner that allows the retractor to wind the webbing thereinto or rewind the webbing therefrom;
a second pretensioner that applies a tension to the webbing in an emergency for the vehicle, thereby restraining the passenger through the webbing;
deceleration detecting means for detecting a decelerating state of the vehicle; and
controlling means for controlling the operations of the first pretensioner and the second pretensioner corresponding to a detected value from the deceleration detecting means,
wherein the controlling means includes correcting means for correcting the detected value of the deceleration detecting means in anticipation of a future condition so as to advance a timing of the first pretensioner to wind the webbing.

12. A method of controlling a seatbelt for a vehicle, comprising:
   detecting a decelerating state of the vehicle by a deceleration detecting sensor;
   correcting a detected value from the deceleration detecting sensor so as to be larger than an actual deceleration of the vehicle or a value in correlation with the actual deceleration; and
   advancing a timing for a pretensioner to wind a webbing of the seatbelt, based on a correction value obtained by correcting the detected value.

13. The method of controlling the seatbelt for the vehicle of claim 12, wherein the detected value of the deceleration detecting sensor is corrected by an expression of:

$$X^- = X + X' \times \Delta t$$

where X represents the detected value of the deceleration detecting sensor, X' a differential value of the detected value X, X$^-$ a corrected value of deceleration and $\Delta t$ represents a time for anticipation.